US012468415B1

(12) United States Patent
Judd et al.

(10) Patent No.: US 12,468,415 B1
(45) Date of Patent: Nov. 11, 2025

(54) SOFTWARE DEFINABLE CONTROLLERS IN VEHICLE RECONFIGURABLE FOR DIFFERENT SEATING GROUPS

(71) Applicant: Thales Avionics, Inc., Irvine, CA (US)

(72) Inventors: Kevin Judd, Irvine, CA (US); Ethan Trokie, Los Angeles, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 18/953,524

(22) Filed: Nov. 20, 2024

(51) Int. Cl.
G06F 3/041 (2006.01)
G06F 3/044 (2006.01)

(52) U.S. Cl.
CPC ............ G06F 3/0416 (2013.01); G06F 3/044 (2013.01)

(58) Field of Classification Search
None
See application file for complete search history.

(56) References Cited

U.S. PATENT DOCUMENTS

| 9,916,013 | B2 | 3/2018 | Sizelove et al. | |
| 9,996,193 | B2 | 6/2018 | Pham | |
| 11,921,927 | B1 | 3/2024 | Kuker et al. | |
| 12,321,533 | B1* | 6/2025 | Judd | ................... H05B 47/196 |
| 2016/0378199 | A1* | 12/2016 | Sizelove | ............... G06F 3/0202 235/449 |
| 2017/0073074 | A1* | 3/2017 | Gagnon | ................... B60Q 3/44 |
| 2022/0055751 | A1* | 2/2022 | Hansson | ............ B64D 11/0624 |

FOREIGN PATENT DOCUMENTS

FR 3136057 A1 12/2023

* cited by examiner

Primary Examiner — Stephen T. Reed
(74) Attorney, Agent, or Firm — Sage Patent Group

(57) ABSTRACT

A seat entertainment system includes a display unit, a handheld controller, and an entertainment system controller. The handheld controller includes an input interface with a grid of touch sensitive elements spaced apart on the input interface, and an interchangeable user input pad which overlays and covers the grid of touch sensitive elements and has indicia indicating locations of user selectable functions. The entertainment system controller includes a set of operational functions and a mapping of the operations functions to corresponding different user touch locations in the grid of touch sensitive elements. The entertainment system controller is operative to: receive signaling from the handheld controller indicating where a user has touch selected the interchangeable user input pad; identify one of the operational functions corresponding to the user touch location based on the mapping; and perform the operational function to control an operation of the seat entertainment system.

10 Claims, 3 Drawing Sheets

SOFTWARE DEFINABLE CONTROLLERS IN VEHICLE RECONFIGURABLE FOR DIFFERENT SEATING GROUPS

FIELD

The present disclosure relates to controlling aircraft inflight entertainment systems and other vehicle entertainment systems.

BACKGROUND

There is an ever-increasing demand from passengers on commercial passenger aircrafts to have a personalized and tailored experience with their entertainment. Premium seating areas on commercial passenger aircrafts often provide a handheld controller to facilitate passengers' control of seatback displays of inflight entertainment (IFE) systems while reclined in a seat or otherwise more distant from the seatback displays.

Existing handheld controllers lack the ability to reconfigure button locations because of the fixed relationship between printed and molded passenger-selectable buttons and the underlying actuation switches having a fixed layout on Printed Circuit Boards (PCBs). Designing, manufacturing, installing and then subsequently replacing PCBs across numerous seats of a fleet of aircraft is costly and time-consuming.

Therefore, a need exists to enable more flexible reconfiguration of physical handheld controllers of IFE systems onboard aircraft.

SUMMARY

Various embodiments are directed to a seat entertainment system including a display unit and a handheld controller. The handheld controller includes an input interface with a grid of touch sensitive elements spaced apart on the input interface. The handheld controller also includes an interchangeable user input pad configured to overlay and cover the grid of touch sensitive elements and having indicia indicating locations of user selectable functions. The handheld controller also includes an entertainment system controller providing a set of operational functions and a mapping of the operational functions to corresponding different user touch locations in the grid of touch sensitive elements. The entertainment system controller is operative to receive signaling from the handheld controller indicating a user has touch selected the interchangeable user input pad at a user touch location in the grid of touch sensitive elements of the input interface. The entertainment system controller is also operative to identify one of the operational functions corresponding to the user touch location based on the mapping. The entertainment system controller is also operative to perform the operational function to control an operation of the seat entertainment system.

Other seat entertainment systems and handheld controllers and corresponding methods and computer program products according to embodiments of the present disclosure will be or become apparent to one with skill in the art upon review of the following drawings and detailed description. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
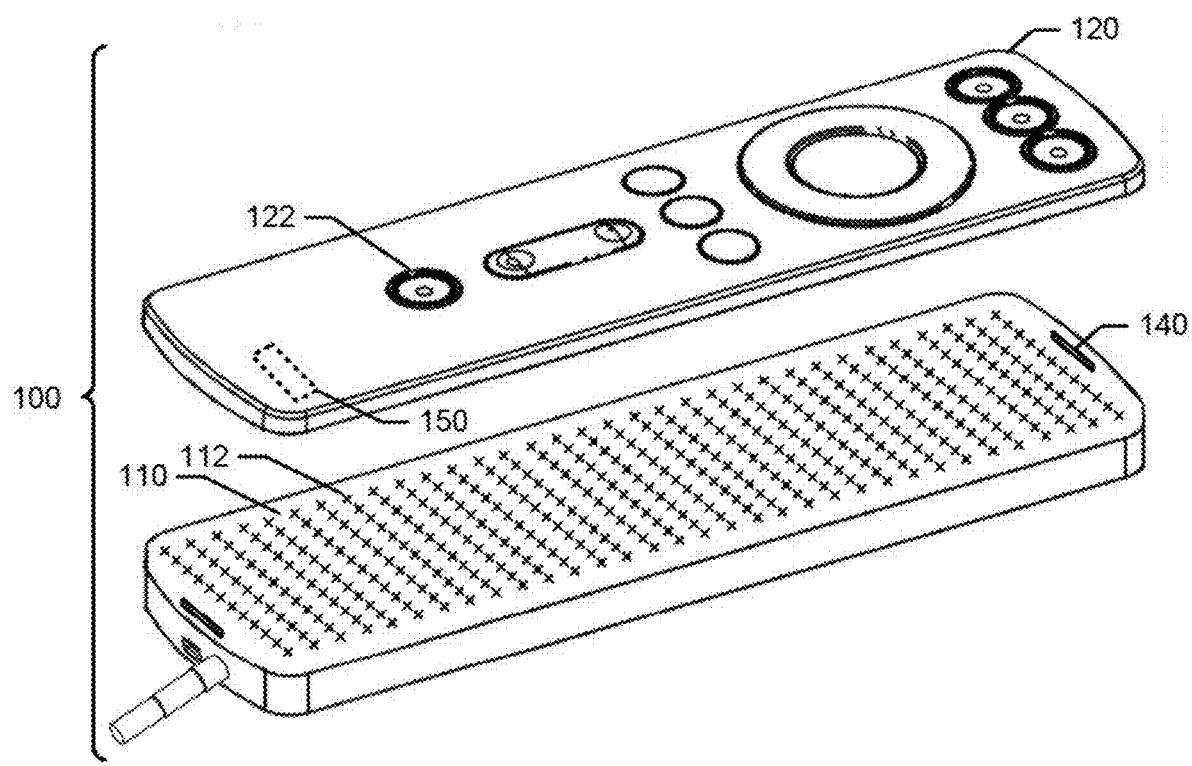
FIG. 1 illustrates an exploded view of a handheld controller configured in accordance with various embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Although various embodiments are explained herein in the context of use of a handheld controller to control aircraft inflight entertainment (IFE) systems, other embodiments are not limited thereto and may be used with other types of vehicles, including, without limitation, ships (e.g., cruise ships), buses, and trains. A non-limiting example entertainment system includes a seat display unit which can be mounted to a seatback, seating partition, armrest, or other location to display content (e.g., movies, television programming, gaming, Internet webpages, etc.) and stream audio (e.g., via a headset jack and/or wireless interface such as Bluetooth).

An IFE handheld controller can be operated by a passenger to control a seat entertainment system to progress through menus, select content stored in an onboard server for playing, and request through a satellite communication link content from ground-based network nodes, e.g., airline content servers and Internet content servers, which are accessible through core networks (e.g., private networks and/or public networks such as the Internet). The term IFE handheld controller is also referred to as a handheld controller or controller for brevity.

Various embodiments are directed to hardware and low-level software approaches for addressing several significant issues. One issue is that there has been an inability to cost-effectively change passenger-selectable button locations on a handheld controller due to need to replace the associated PCB with a redesigned PCT. Designing, manufacturing, installing and then subsequently replacing PCBs across numerous seats of a fleet of aircraft is costly and time-consuming. In accordance with embodiments disclosed herein, the number, size, and layout of passenger-selectable buttons and other indicia can be reconfigured without the need to replace the associated PCB and perform other such hardware modifications.

Providing such cost-effective reconfiguration enable operators to flexible upgrade and modify the look and feel of handheld controllers on aircraft. In the aviation industry, maintaining and updating the aesthetic and functional aspects of aircraft interiors is crucial for passenger satisfaction and brand differentiation. Various embodiments allow for these upgrades to be performed efficiently, ensuring that airlines can keep their cabins modern and appealing without extensive downtime or expense.

Various embodiments also facilitate on-aircraft repairs through the use of replaceable user interface pads or coverings. This feature is particularly important for the aviation industry, where minimizing aircraft downtime is essential. By enabling quick and easy repairs, airlines can ensure that their aircraft remain in service longer, reducing the need for costly and time-consuming maintenance procedures.

Furthermore, various embodiments allow for a high degree of customization in passenger interface controls. Passengers in different cabin classes can have different handheld controller button and indicia layouts, enhancing differentiation between the cabin classes and the passengers' associated experience. This customization can be achieved without significant additional costs, making it an attractive option for airlines looking to differentiate their service offerings and improve passenger satisfaction.

Previously, these problems were addressed through complete redesigns of controllers and PCBs. However, those approaches were far from ideal. Complete redesigns are not only expensive but also time-consuming, often requiring extensive testing and certification processes. Additionally, they do not offer the flexibility needed to quickly adapt to changing requirements or preferences.

The prior approaches also lacked the capability to easily implement changes. Once a handheld controller or PCB was designed and manufactured, making any modifications required essentially restarting the process from the beginning. This lack of flexibility was a significant drawback, particularly in an industry where rapid adaptation to new technologies and customer preferences is crucial.

Various present embodiments enable a more efficient and flexible approach to changing handheld controller passenger interface layout and operational functionality. Quick customization of handheld controller operational functionality can be performed through updates to software and changes to the controller shell, which provides a much more adaptable solution. These embodiments can enable airlines to better meet their needs for different handheld controllers for various cabin classes or entirely different layouts for different airlines without the need for PCB redesign and replacement.

IFE systems using these handheld controllers can serve the diverse needs of airlines and enable IFE systems to be more easily adapted to different cabin classes. Different airlines have different requirements and preferences for their cabin interiors. Various embodiments allow for these differences to be accommodated easily, enabling a tailored experience for each airline and their regional passengers' preferences.

The ability to quickly update and customize handheld controllers also means that airlines can respond more rapidly to feedback from passengers. If passengers express a preference for certain layouts or features, airlines can implement these changes quickly and efficiently, enhancing the overall passenger experience and satisfaction.

Moreover, various embodiments support the trend towards more personalized and high-quality passenger experiences. As airlines compete to offer the best in-flight experience, the ability to customize and upgrade passenger controls becomes increasingly important. Various embodiments position airlines to meet these demands effectively.

In summary, various embodiments represent a significant advancement in the hardware and low-level software domain, offering a flexible, cost-effective, and efficient solution to several longstanding problems. By enabling quick customization, reducing the need for costly redesigns, and supporting on-aircraft repairs, the present embodiments can provide substantial benefits to the aviation industry.

Various embodiments are primarily implemented within the hardware and low-level software domain. At a high level, the primary challenge addressed is how to provide each airline with its own customized handheld controller (also called passenger control unit (PCU)) without incurring significant costs. Currently, the industry relies on static PCBs with fixed button locations. Whenever there is a need to change these button locations, a complete PCB respin is required, which is both time-consuming and costly.

In accordance with some present embodiments, a handheld controller includes an input interface with a 2 dimensional (2D) grid of touch sensitive elements spaced apart on the input interface. Passenger touch selection of a location among the grid of touch sensitive elements sends data identifying location of the touch to an entertainment system controller having software that triggers a corresponding operational function, which may include controlling seat lighting, requesting crew assistance, navigating an entertainment system user interface, controlling seat actuation mechanism, browsing Internet content, etc.

Various embodiments are directed to a seat entertainment system including a display unit 430 (FIG. 4), a handheld controller 100, and an entertainment system controller 462 (FIG. 4) which may be part of an onboard IFE content server 460 (FIG. 4), the display unit 430 (FIG. 4) or located elsewhere. The handheld controller 100 includes an input interface 110 with a grid of touch sensitive elements 112 spaced apart on the input interface 110. The handheld controller 100 also includes an interchangeable user input pad 120 configured to overlay and cover the grid of touch sensitive elements 112 and having indicia indicating locations of passenger selectable functions. The handheld controller 100 is communicatively connected to the entertainment system controller through a wired communication tether or wireless communication transceiver (e.g., Bluetooth, etc.).

The entertainment system controller 462 (FIG. 4) includes a set of operational functions and a mapping of the operations functions to corresponding different passenger selectable touch locations 122 in the grid of touch sensitive elements 112. The entertainment system controller 462 (FIG. 4) is operative to receive signaling from the handheld controller 100 indicating a passenger has touch selected the interchangeable user input pad 120 at a passenger touch location in the grid of touch sensitive elements 112 of the input interface 110. The entertainment system controller 462 (FIG. 4) is also operative to identify one of the operational functions corresponding to the passenger touch location based on the mapping, and to perform the operational function to control an operation of the seat entertainment system (e.g., navigate through a menu displayed on the display unit, select content for playing, navigate through an Internet website accessible through a satellite communication link, etc.).

Passenger touch selection of buttons and other indicia on the user input pad 120 causes corresponding activation of one or more touch sensitive elements of the input interface 110, and output of signaling to the entertainment system controller. The input interface 110 and interchangeable user input pad 120 can be connected so as to enable replacement of the user input pad 120 with another user input pad having a different number and/or layout of passenger selectable buttons, indicia, etc. The pad 120 and interface 110 may be connected through latches 140, glue, screws, hinges, or any other structure configured to fixedly hold the interchangeable user input pad 120 and entertainment system controller 130 together. The pad 120 may be formed from a flexible silicon, rubber, or other material layer, or may be formed from a rigid material, e.g., plastic, composite, metal, or other rigid material, and may comprise one or more parts.

As described in further detail below, the interchangeable user input pad 120 may include an identification element 150 which operations to uniquely identify the type of interchangeable user input pad 120 to the entertainment system controller 462 (FIG. 4), such as indicating the number and/or layout of passenger selectable buttons, indicia, etc. and the corresponding operational functionality to be mapped thereto). The identification element 150 may be configured in many ways and provided at more than one location on the user input pad 120, as explained in further detail below.

The identification element 150 of the interchangeable user input pad 120 may alternatively include machine readable optical code (e.g., bar code, quick response "QR" code, identification number, etc.). In these embodiments, the interchangeable user input pad 120 may be scanned at a control panel or a technician may enter an identification number at the control consul. We might during implementation for aircraft have to be creative in how we determine the part number of the unit as this is tethered and would therefore be attached to type certificate of the aircraft In some embodiments, the input interface 110 includes a trackpad having a grid of touch sensitive elements each configured to indicate location within the grid of a passenger touch and to further indicate force of the passenger touch. This hardware configuration allows passengers to press anywhere on the input pad, resulting in the handheld controller signaling to the entertainment system controller an indication of the location of the touch (e.g., indication of coordinates within the grid) and further indicating the force of the touch. The entertainment system controller can then identify an operational function that is mapped to the touch and provide input to that operational function based on the force of the touch. This approach provides a versatile input mechanism that can adapt to various passenger interactions.

In some other embodiments, the input interface 110 includes an x-y grid of touch sensitive elements spaced apart and which sense only the position of the touch without measuring the force. In this approach, the entertainment system controller would register signaling from the handheld controller indicating a passenger has touch selected the interchangeable user input pad at a passenger touch location in the grid of touch sensitive elements of the input interface. Continued depression of an area may be interpreted by the entertainment system controller as triggering multiple touches and/or as a passenger further selection of operational functionality.

The interchangeable user input pad can be formed with various configurations of buttons and other passenger selectable indicia in different shapes and sizes. These configurations can include D-pads, circular pads, up/down buttons, and single buttons. The entertainment system controller can be configured through software to have a set of operational functions and a mapping of the operations functions to corresponding different passenger touch locations in the grid of touch sensitive elements. The mapping can be reconfigured through updated software or through input that identifies a new mapping that is to be provided to enable reconfiguration of the handheld controller. Th resulting flexible reconfiguration allows for handheld controller customizations that were previously cost-prohibitive.

Figure 2A:
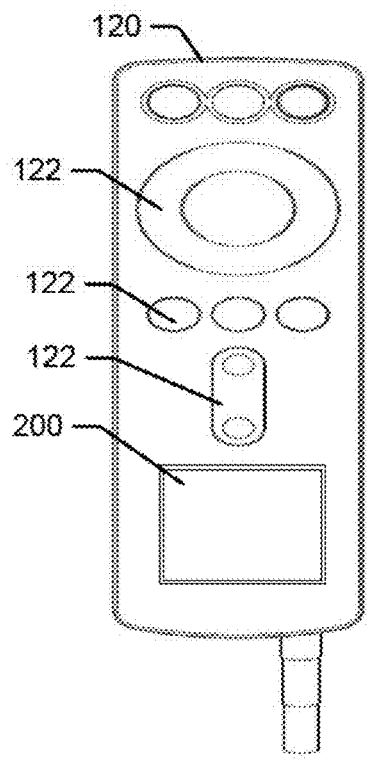
FIGS. 2A and 2B illustrate two different interchangeable user input pads with different user touch locations configured in accordance with various embodiments of the present disclosure.
Figure 2B:
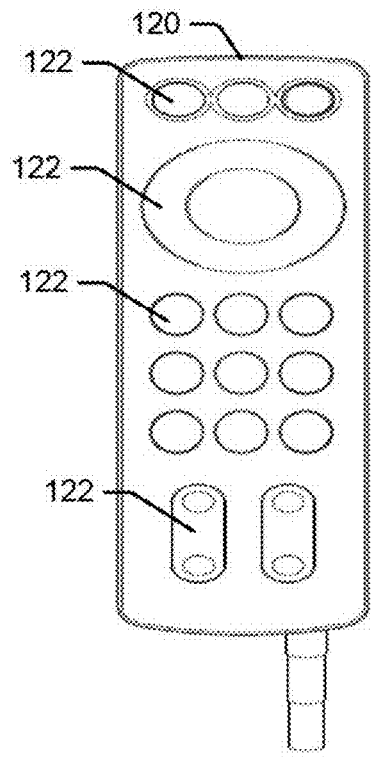

FIGS. 2A and 2B illustrate two different interchangeable user input pads 120 with different passenger selectable buttons and other indicia 122 in accordance with various embodiments of the present disclosure. The embodiment of FIG. 2A illustrates an opening (window) 200 which exposes a portion of the grid of touch sensitive elements spaced apart on the input interface 110 underlying the user input pad 120.

With various embodiments, it becomes possible to create interchangeable user input pad for handheld controllers that are customized for different airlines, aircraft types, cabin seat layouts, and differing preferences of passengers in regional operational areas without requiring extensive redesign and replacement of the handheld controller hardware. Instead, a new user input pad ("cover") is provided and an update is performed in the entertainment system controller for the mapping of operations functions to corresponding different passenger touch locations of the new user input pad triggering different areas in the grid of touch sensitive elements. This significantly reduces the time and costs involved in such changes. This capability allows airlines to offer a more personalized experience to their passengers without incurring substantial additional costs.

Furthermore, various embodiments allow for different button and controller layouts for passengers in different cabin classes. This customization leads to a more tailored and enhanced passenger experience, catering to the specific needs and preferences of different passenger segments. The ability to offer such customized experiences without significant additional costs is a major advantage for airlines.

The entertainment system controller may be preconfigured with groups of mappings between defined layouts of passenger selectable buttons/indicia and corresponding operational functions. The entertainment system controller can then be simply informed of a known type of user input pad that has been installed on the handheld controller, and the entertainment system controller can responsively select a corresponding set of mappings from among a plurality of sets stored in local memory. In some embodiments, the seat entertainment system also includes a group of interchangeable sets of operational functions with mapping to corresponding different passenger touch locations in the grid of touch sensitive elements. The entertainment system controller is further operative to have further mapping of the group of interchangeable sets to different types of interchangeable user input pads. The entertainment system controller is also further operative to identify type of interchangeable user input pads is overlaying and covering the grid of touch sensitive elements and to responsively select one of the sets of operational functions among the group of interchangeable sets of operational functions which is mapped to the identified type of user input pads. The entertainment system controller is also further operative to use the select one of the sets of operational functions map subsequent indications of passenger touch locations to operational functions to be performed.

The term user input pad is used to refer to any type of surface or assembly having buttons, indicia, etc. that can be touch selected by a passenger to control an entertainment system.

The interchangeable user input pad may be constructed in many ways.

Figure 3:
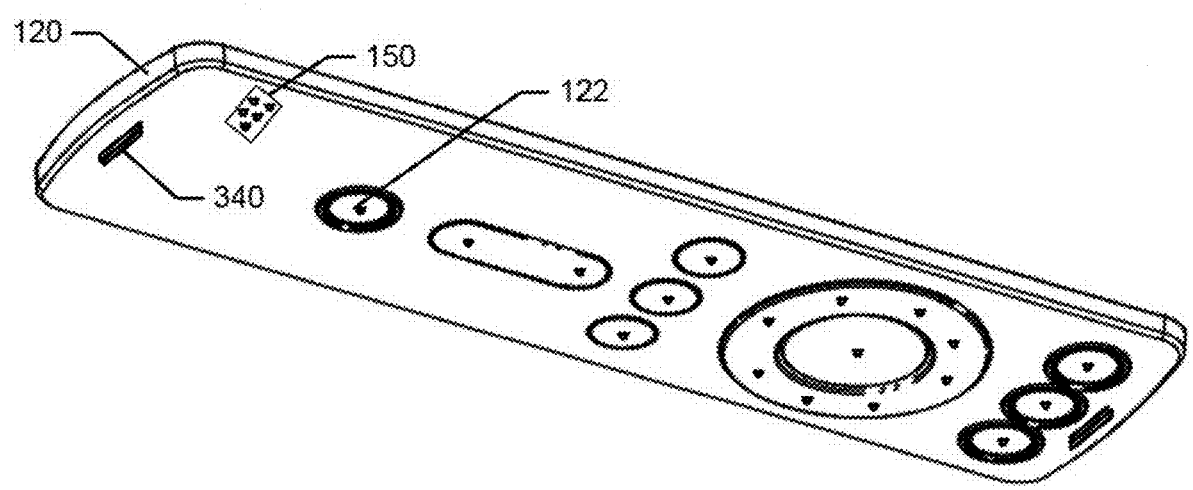
FIG. 3 illustrates an example implementation of the underside of an interchangeable user input pad with an identification element operative in accordance with various embodiments of the present disclosure.

FIG. 3 illustrates an underside of the interchangeable user input pad 130 with an identification element 150 in accordance with some embodiments of the present disclosure. The identification element is configured to identify a type of user input pad that is overlaying and covering the grid of touch sensitive elements, and the entertainment system controller is operative to obtain an indication of the identification of the type of interchangeable user input pad from the identification element.

The interaction between the identification element 150 of the interchangeable user input pad and the input interface may be achieved through the use of many techniques used in current button technology.

In some embodiments, the identification element 150 includes at least one post extending from a location indicative of the type of interchangeable user input pad.

In some other embodiments, the identification element 150 includes a pair of posts extending from laterally spaced apart locations, wherein a distance between the laterally spaced apart locations is indicative of the type of interchangeable user input pad.

In some other embodiments, the identification element 150 include a conductive line segment that electrically contacts spaced conductive contacts among the grid of touch sensitive elements to complete a circuit indicating the type of interchangeable user input pad to the entertainment system controller.

In some embodiments, the identification element 150 includes a material configured to be capacitively coupled to a corresponding one or more of the touch sensitive elements in the grid indicating the type of interchangeable user input pad to the entertainment system controller.

Various embodiments' ability to sense touch inputs through a 2D grid is a significant technological advancement. This grid can precisely detect the location of a touch, allowing for predictable and reliable control and interaction with the entertainment system. Software interpretation of the reconfigurable mapping of the operations functions to corresponding different passenger touch locations in the grid of touch sensitive elements, enables the system to be highly adaptable.

Use of a trackpad that measures the force of a passenger's press can expand the level of functionality. This feature can be particularly useful in scenarios where different levels of pressure need to be detected and acted upon. For example, a light touch could perform one function, while a harder press could trigger a different action, providing a more intuitive and responsive user interface.

The flexibility of the button configurations on the pad is another key advantage. Airlines can design their own unique layouts that best suit their branding and passenger needs. This customization can include different shapes and sizes of buttons, arranged in any configuration desired. The software mapping ensures that these custom layouts function seamlessly, providing a consistent and reliable passenger experience.

The eco-friendly aspects of the various embodiments are also noteworthy. By allowing for replaceable coverings and reducing the need for complete hardware overhauls, the various embodiments promote sustainability. Airlines can update and maintain their handheld controllers without generating excessive electronic waste, aligning with global efforts to reduce environmental impact.

Additionally, various embodiments support the trend towards more personalized passenger experiences. As competition in the aviation industry intensifies, airlines are seeking ways to differentiate their services. Various embodiments enable them to offer a higher level of customization, enhancing passenger satisfaction and loyalty.

In conclusion, this solution is a comprehensive solution to the challenges of providing customized passenger control units in the aviation industry. It leverages advanced hardware and software technologies to offer a flexible, cost-effective, and eco-friendly approach. By addressing the needs of airlines and their passengers, it sets a new standard for IFE systems.

Figure 4:
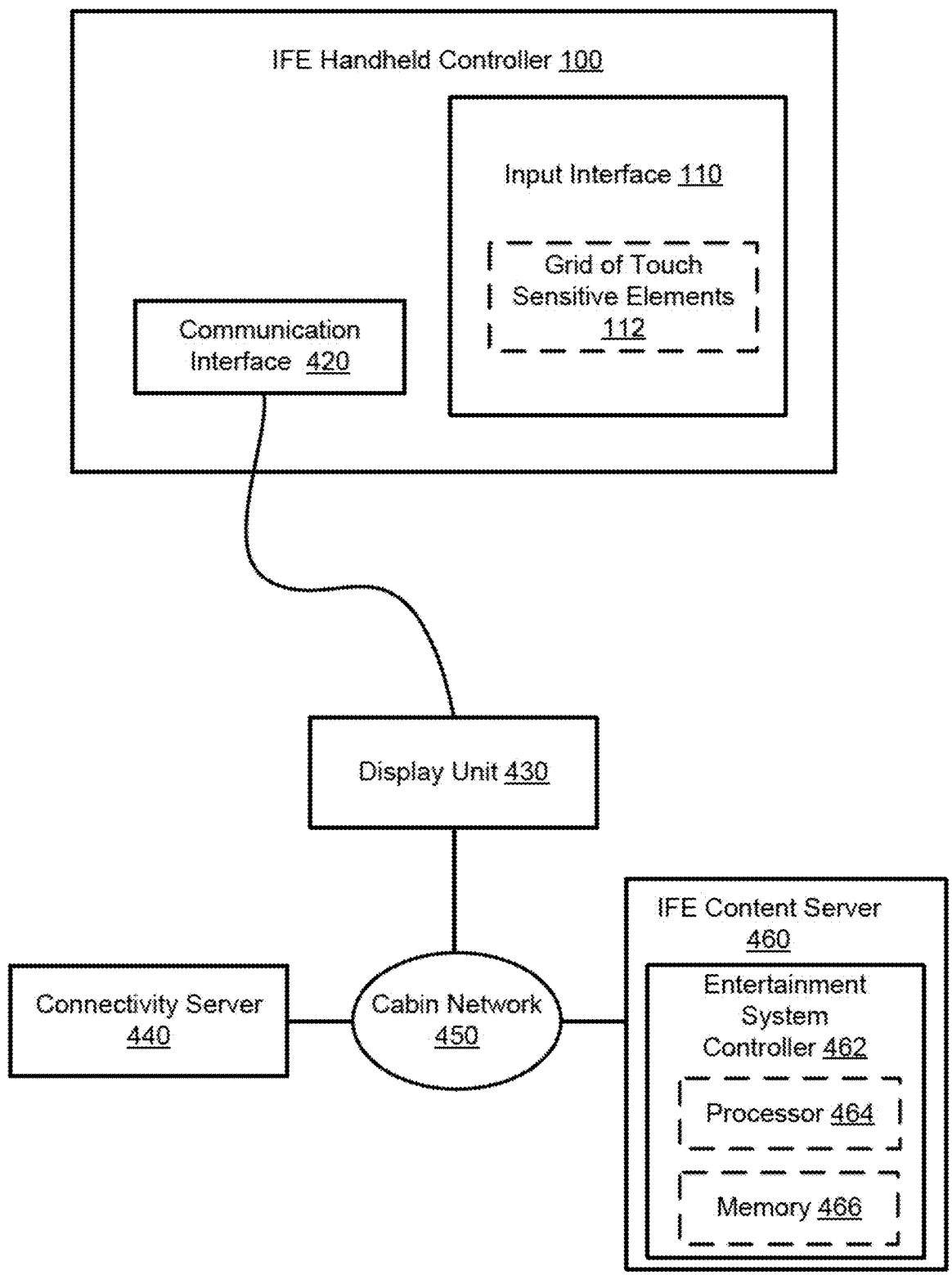
FIG. 4 illustrates a simplified system block diagram of an example handheld controller communicatively connected to control a seat display unit of an IFE system in accordance with some embodiments.

FIG. 4 illustrates a simplified system block diagram of an example handheld controller 100 communicatively connected to control a seat display unit 430 in accordance with some embodiments.

Referring to FIG. 4, the handheld controller 100 includes an input interface 110 with a grid of touch sensitive elements 112 spaced apart on the input interface, and a communication interface 420 that provides signaling to an entertainment system controller 462 indicating a passenger has touch selected the interchangeable user input pad 120 (FIGS. 1, 2A, 2B, 3) at a user touch location in the grid of touch sensitive elements 112. The communication interface 420 communicates through a wired communication cord or a wireless communication interface with the entertainment system controller 462. In the example of FIG. 4, the handheld controller 100 communicates through a wired cord to an interface of the display unit 430, which communicates corresponding data through one or more cabin networks 450 to an IFE content server 460 which includes the entertainment system controller 462. Functionality of the entertainment system controller 462 may be alternatively implemented in the display unit 430 or elsewhere. The entertainment system controller 462 includes at least one processor 464 and at least one memory 466 storing instructions executable by the processor 464 to perform operations according to various embodiments disclosed herein.

As explained above, the entertainment system controller 462 includes a set of operational functions and a mapping of the operations functions to corresponding different user touch locations in the grid of touch sensitive elements. The entertainment system controller 462 receives signaling from the handheld controller indicating a user has touch selected the interchangeable user input pad at a user touch location in the grid of touch sensitive elements of the input interface. The entertainment system controller 462 identifies one of the operational functions corresponding to the user touch location based on the mapping, and performs the operational function to control an operation of the seat entertainment system. The operational function may navigate an entertainment system user interface (displayed by the display unit 430 to the passenger), select a movie or other content for playing through the display unit 430, communicate with ground-based network nodes (e.g., content servers, Internet servers, etc.) through a connectivity server 440 and a satellite communication modem and antenna. The operation function may additionally control seat lighting, request crew assistance, control a seat actuation mechanism, etc.

FURTHER DEFINITIONS AND EMBODIMENTS

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should be also noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

The invention claimed is:
1. A seat entertainment system comprising:
    a display unit;
    a handheld controller comprising:
        an input interface with a grid of touch sensitive elements spaced apart on the input interface, and
        an interchangeable user input pad configured to overlay and cover the grid of touch sensitive elements and having indicia indicating locations of user selectable functions; and an entertainment system controller comprises a set of operational functions and a mapping of the operations functions to corresponding different user touch locations in the grid of touch sensitive elements, wherein the entertainment system controller is operative to:

receive signaling from the handheld controller indicating a user has touch selected the interchangeable user input pad at a user touch location in the grid of touch sensitive elements of the input interface, identify one of the operational functions corresponding to the user touch location based on the mapping, and perform the operational function to control an operation of the seat entertainment system.

2. The seat entertainment system of claim 1, wherein the input interface comprises a trackpad with the grid of touch sensitive elements, each configured to indicate force of a user touch.

3. The seat entertainment system of claim 1, further comprising:

a group of interchangeable sets of operational functions with mapping to corresponding different user touch locations in the grid of touch sensitive elements;

wherein the entertainment system controller is further operative to:

have further mapping of the group of interchangeable sets to different types of interchangeable user input pads, identify type of interchangeable user input pads is overlaying and covering the grid of touch sensitive elements and to responsively select one of the sets of operational functions among the group of interchangeable sets of operational functions which is mapped to the identified type of user input pads, and use the select one of the sets of operational functions map subsequent indications of user touch locations to operational functions to be performed.

4. The seat entertainment system of claim 3, wherein:

the group of interchangeable sets comprises first and second interchanging sets; and the entertainment system controller is further operative to:

use a first mapping of the first interchangeable set to a first type of interchangeable user input pad;

use a second mapping of the second interchangeable set for a second type of interchangeable user input pad;

respond to identifying the first type of interchangeable user input pad is overlaying and covering the grid of touch sensitive elements, by responsively selecting the first interchangeable set of operational functions to determine mapping to corresponding different user touch locations in the grid of touch sensitive elements; and respond to identifying the second type of interchangeable user input pad is overlaying and covering the grid of touch sensitive elements, by responsively selecting the second interchangeable set of operational functions to determine mapping to corresponding different user touch locations in the grid of touch sensitive elements.

5. The seat entertainment system of claim 3, wherein the interchangeable user input pad comprises:

an identification element configured to identify a type of user input pad that is overlaying and covering the grid of touch sensitive elements, and the entertainment system controller is operative to obtain an indication of the identification of the type of interchangeable user input pad based on the identification element.

6. The seat entertainment system of claim 1, wherein the interchangeable user input pad comprises:

at least one post extending from a location indicative of the type of interchangeable user input pad.

7. The seat entertainment system of claim 1, wherein the interchangeable user input pad comprises:

a pair of posts extending from laterally spaced apart locations, wherein a distance between the laterally spaced apart locations is indicative of the type of interchangeable user input pad.

8. The seat entertainment system of claim 1, wherein the interchangeable user input pad comprises:

a conductive line segment that electrically contacts spaced conductive contacts among the grid of touch sensitive elements to complete a circuit indicating the type of interchangeable user input pad to the entertainment system controller.

9. The seat entertainment system of claim 1, wherein the interchangeable user input pad comprises:

a material configured to be capacitively coupled to a corresponding one or more of the touch sensitive elements in the grid indicating the type of interchangeable user input pad to the entertainment system controller.

10. The seat entertainment system of claim 1, wherein the entertainment system controller is operative to control at least one of: seat lighting, generating a request for crew assistance, navigation of an entertainment system user interface, and controlling a seat actuation mechanism.

* * * * *